Patented Sept. 30, 1930

1,776,819

UNITED STATES PATENT OFFICE

ELOI RICARD, OF MELLE, FRANCE, ASSIGNOR TO SOCIÉTÉ ANONYME DES DISTILLERIES DES DEUX-SEVRES, OF MELLE, FRANCE

PROCESS FOR INCREASING THE OUTPUT IN THE EXTRACTION OF CRYSTALLIZED SUGAR FROM MOLASSES AND SIRUPS

No Drawing. Application filed August 23, 1926, Serial No. 131,132, and in Belgium September 5, 1925.

In certain processes, acetic acid is employed for extracting the saccharose contained in molasses or sirups resulting from the manufacture of sugar.

For this purpose, concentrated acetic acid at 98–99 per cent is mixed with a certain amount of molasses containing 25–28 per cent of water such as is obtained in sugar manufacture, or with molasses which is preliminarily concentrated by the apparatus in common use in sugar factories, and which contains only 10–12 per cent of water. This produces a homogeneous mixture, and after it is agitated and then allowed to stand for a long time, there will be slowly crystallized some 60–80 per cent of saccharose in 10–15 hours.

I have ascertained that the insufficient output thus produced is due to the two following causes: firstly, the small amount of water remaining in the mixture holds in solution a certain quantity of saccharose and further its inversion by the acetic acid if the operating temperature is somewhat high; and secondly, the saccharose is not altogether insoluble in the anhydrous acetic acid in the presence of bodies other than sugar.

It is further recognized that the viscosity of the mixture hinders and delays the crystallization.

I have discovered that it is feasible to counteract the effect of these two prejudicial causes by adding to the mixture of acetic acid and molasses a certain amount of an agent such as anhydrous ethyl acetate which has the property of rendering the saccharose entirely insoluble in the mass, and of preventing the inversion of the sugar, and diminishing the viscosity of the environment.

Example.—I employ 100 parts by volume of molasses which is preliminarily concentrated to the maximum by the usual means and is raised to 50–70 degrees C., and mix with the same in an expeditious manner, by properly stirring, 50–60 parts by volume of anhydrous acetic acid. To the resulting homogeneous mixture I then add slowly, stirring meanwhile, 50–60 parts by volume of anhydrous ethyl acetate. The mixture is allowed to stand, and after 2 or 3 hours the whole of the saccharose is precipitated.

I may employ other products than ethyl acetate which possess the above-mentioned properties, either alone or mixed together, such as the acetates of the ethyl, propyl, isopropyl, or butyl groups, as well as the methyl or ethyl alcohol.

It will be understood therefore that any agents having the properties of rendering the saccharose insoluble in water and of preventing the inversion of the sugar are to be regarded as the full equivalents, for the purposes of this invention, of the agents specified in the following claims, and as being embraced within the scope thereof.

Claims:

1. In the extraction of sugar by the use of acetic acid, the process which consists in adding to the mixture of the sugar liquid and acetic acid a compound of the class consisting of alkyl alcohols and alkyl acetates whereby inversion of the sugar and of the solution of the saccharose in water and acetic acid are substantially prevented.

2. In the extraction of sugar from a sugar liquid by means of acetic acid, the process which consists in adding an acetate of the alkyl group to the mixture of acetic acid and sugar liquid in order to counteract the solubility of the saccharose in water and acetic acid, and to prevent the inversion of the sugar.

3. In the extraction of sugar from a sugar liquid by means of acetic acid, the process which consists in adding anhydrous ethyl acetate to the mixture of acetic acid and sugar liquid in order to counteract the solubility of the saccharose in water and acetic acid, and to prevent the inversion of the sugar.

4. A process for the extraction of sugar, which consists in adding anhydrous acetic acid to the molasses which has been concentrated and heated to some 50–70 degrees C. and in further adding thereto anhydrous ethyl acetate, in allowing the whole to stand, and in collecting the precipitated saccharose.

In testimony whereof I have signed this specification.

ELOI RICARD.